United States Patent
Chien (10) Patent No.: US 8,670,766 B2
(45) Date of Patent: Mar. 11, 2014

(54) METHOD OF SET-TO-SET LOCATION SERVICE IN A COMMUNICATION SYSTEM

(75) Inventor: Ho-Sung Chien, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 147 days.

(21) Appl. No.: 13/433,260

(22) Filed: Mar. 28, 2012

(65) Prior Publication Data

US 2012/0252492 A1 Oct. 4, 2012

Related U.S. Application Data

(60) Provisional application No. 61/468,589, filed on Mar. 29, 2011.

(51) Int. Cl.
*H04W 36/00* (2009.01)
(52) U.S. Cl.
USPC ........................................ 455/440; 705/14.58
(58) Field of Classification Search
USPC ............ 455/456.2, 436, 442, 432.1; 370/331; 705/14.58
See application file for complete search history.

(56) References Cited

U.S. PATENT DOCUMENTS

2010/0120435 A1* 5/2010 Mia et al. ...................... 455/440
2012/0095839 A1* 4/2012 LaBarca ..................... 705/14.58

OTHER PUBLICATIONS

User Plane Location Protocol; Candidate Version 3.0—Sep. 20, 2011; Open Mobile Alliance; OMA-TS-ULP-V3_0-20110920-C.
Secure User Plane Location Architecture; Candidate Version 3.0—Sep. 20, 2011; Open Mobile Alliance; OMA-AD-SUPL-V3_0-20110920-C.
Secure User Plane Location Requirements; Candidate Version 3.0—Sep. 20, 2011; Open Mobile Alliance; OMA-RD-SUPL-V3_0-20110920-C.

* cited by examiner

*Primary Examiner* — Phuoc H Doan
(74) *Attorney, Agent, or Firm* — Winston Hsu; Scott Margo (57) ABSTRACT

A method of performing a SET-to-SET location service in a communication system is disclosed. The method comprises a first SUPL enabled terminal (SET) of the communication system sending a first Secure User Plane Location (SUPL) message to a home SUPL Location Platform (H-SLP) of the communication system for starting a session to query a plurality of location information of a second SET of the communication system, the H-SLP performing a positioning procedure with the second SET according to the first SUPL message, the second SET providing the plurality of location information, and the H-SLP sending a plurality of second SUPL messages to the first SET.

14 Claims, 7 Drawing Sheets

METHOD OF SET-TO-SET LOCATION SERVICE IN A COMMUNICATION SYSTEM

CROSS REFERENCE TO RELATED APPLICATIONS

This application claims the benefit of U.S. Provisional Application No. 61/468,589, filed on Mar. 29, 2011 and entitled "Method of continuously triggered SET to SET Location Service", the contents of which are incorporated herein.

BACKGROUND OF THE INVENTION

1. Field of the Invention

The invention relates to a method of a location service in a communication system, and more particularly, to a method for a mobile device to initiate a location service for obtaining multiple location information of another mobile device in a communication system.

2. Description of the Prior Art

Open Mobile Alliance (OMA) is the focal point for the development of mobile service enabler specifications, which support the creation of interoperable end-to-end mobile services. OMA drives service enabler architectures and open enabler interfaces that are independent of the underlying wireless networks and platforms. OMA also creates interoperable mobile data service enablers that work across devices, service providers, operators, networks, and geography. Toward that end, OMA will develop test specifications, encourage third party tool development, and conduct test activities that allow vendors to test their implementations.

OMA has a number of technical working groups for developing mobile services enabler specifications. Among these working groups, the OMA Location Working Group develops Secure User Plane Location (SUPL), which employs user plane data bearers for transferring location assistance information such as GPS assistance data, and for carrying positioning technology-related protocols between mobile terminal and the network.

In OMA SUPL specification, SUPL network is an access network which facilitates the Location determination functionality and provides the SUPL bearer for a SUPL Enabled Terminal (SET) to communicate with. The SET is a logical entity in a device capable of communicating with the SUPL network, to perform a SUPL service with a SUPL Location Platform (SLP). Examples of such SET could be a UE in Universal Mobile Telecommunications System (UMTS) or Long-Tern Evolution (LTE), a MS in Global System for Mobile Communications (GSM) or Interim Standard 95 (IS-95), or a PC over an IP-based transport. The SUPL Location Platform (SLP) is an entity responsible for SUPL Service Management and Position Determination. The SLP contains the SUPL Location Center (SLC) and SUPL Positioning Center (SPC) Functions. The SLC coordinates the operations of SUPL in the network and interacts with the SUPL Enabled Terminal (SET) over User Plane bearer, while the SPC is an entity in the SUPL network responsible for all messages and procedures required for position calculation and for the delivery of assistance data.

The first version, i.e. version 1.0, of SUPL released in Jun. 15, 2007 specifies architecture of SUPL service enabler, including context model, functional blocks, logical entities, reference points or interfaces, messages and message flows for the SUPL service enabler. Currently, SUPL has been developed to version 3.0. In version 3.0 of SUPL, several services are added. One of the services is $3^{rd}$ party relative location, where a SET can request for obtaining location information of another SET. However, in the $3^{rd}$ party relative location service, the SET obtains only one location information at one time of another SET. Though a SET can initiate multiple positioning sessions for obtaining multiple location information at different times of another SET, such method is inefficient, and wastes network and radio sources.

SUMMARY OF THE INVENTION

It is therefore a primary objective of the present invention to provide a method for a SET to initiate a location service for obtaining multiple location information of another SET in a communication system.

The present invention discloses a method of performing a SET-to-SET location service in a communication system, comprising a first SUPL enabled terminal (SET) of the communication system sending a first Secure User Plane Location (SUPL) message to a home SUPL Location Platform (H-SLP) of the communication system for starting a session to query a plurality of location information of a second SET of the communication system; the H-SLP performing a positioning procedure with the second SET according to the first SUPL message; the second SET providing the plurality of location information; and the H-SLP sending a plurality of second SUPL messages to the first SET; wherein each of the plurality of second SUPL messages comprises one of the plurality of location information.

It is a further objective of the present invention to provide a method for an entity of a communication system to perform a SET-to-SET location service in the communication system.

The present invention further discloses a method of performing a SET-to-SET location service in a communication system for a first SUPL Enabled Terminal (SET), comprising sending a first Secure User Plane Location (SUPL) message to a home SUPL Location Platform (H-SLP) of the communication system, for starting a session to query a plurality of location information of a second SET of the communication system; and receiving a plurality of second SUPL messages from the H-SLP; wherein the H-SLP starts a positioning procedure with the second SET when the H-SLP receives the first SUPL message, and wherein each of the plurality of second SUPL messages comprises one of the plurality of location information.

The present invention further discloses a method of performing a SET-to-SET location service in a communication system for a home SUPL Location Platform (H-SLP), comprising receiving a first Secure User Plane Location (SUPL) message from a first SUPL Enabled Terminal (SET) of the communication system for starting a session to query a plurality of location information of a second SET of the communication system; performing a positioning procedure with the second SET according to the first SUPL message; receiving the plurality of location information of the second SET; and sending a plurality of second SUPL messages to the first SET; wherein each of the plurality of second SUPL messages comprises one of the plurality of location information.

The present invention further discloses a method of performing a SET-to-SET location service in a communication system for a second SUPL Enabled Terminal (SET), comprising performing a positioning procedure with a home SUPL Location Platform (H-SLP) of the communication system; providing a plurality of location information; and sending the plurality of the location information to the H-SLP; wherein the positioning procedure is started by the H-SLP when the H-SLP receives a Secure User Plane Location (SUPL) message from a first SET.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
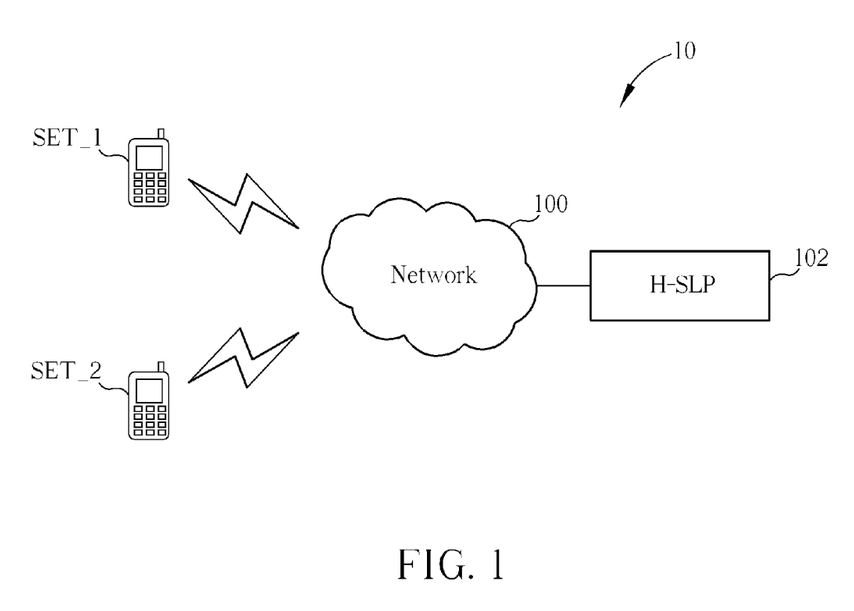
FIG. 1 is a schematic diagram of a communication system according to an embodiment of the present invention.

Please refer to FIG. 1, which is a schematic diagram of a communication system 10 according to an embodiment of the present invention. The communication system 10 includes a network 100, and a home SUPL Location Platform (H-SLP) 102, a first SUPL Enabled Terminals (SET) SET_1 and a second SET SET_2. For simplicity, only two SETs (e.g. SET_1 and SET_2) are shown in FIG. 1, but not limited herein. In FIG. 1, the first SET SET_1 or the second SET SET_2 may be called with a different name, for example, a mobile station (MS), which is named for a mobile device in GSM system. The first SET SET_1 and the second SET SET_2 may be mobile devices such as mobile phones, laptops, tablet computers, electronic books, and portable computer systems. The first set SET_1 and the second SET SET_2 may connect to the same network 100, as illustrated in FIG. 1, or different networks. Practically, the network 100 can be referred as to a cellular network like universal terrestrial radio access network (UTRAN) comprising a plurality of Node-Bs (NBs) in the UMTS, evolved UTRAN (E-UTRAN) comprising a plurality of evolved NBs (eNBs) in the LTE system, or E-UTRAN comprising a plurality of eNBs and relays in the LTE Advanced (LTE-A) system. Further, the network 100 can be referred to as a wired network that is IP-based and can provide IP-based services and related applications. However, the network 100 is not limited herein. The H-SLP 102 is responsible for SUPL service management and position determination for the first SET SET_1 and the second SET SET_2.

Figure 2:
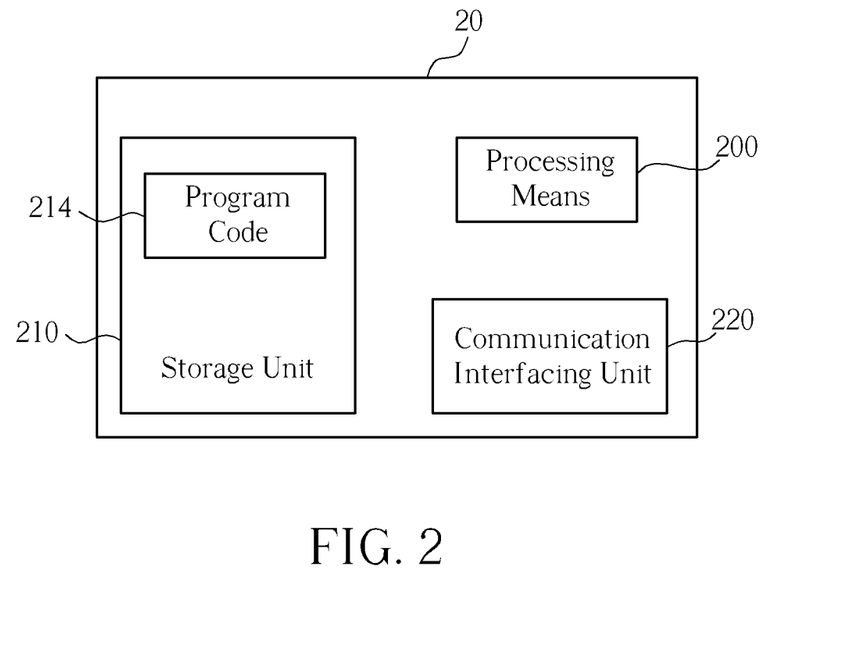
FIG. 2 is a schematic diagram of an exemplary communication device of the present invention.

FIG. 2 illustrates a schematic diagram of an exemplary communication device 20. The communication device 20 may be implementation of the first SET SET_1, the second SET SET_2 or the H-SLP 102 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange signals with the network 100 according to processing results of the processing means 200.

Figure 3A:
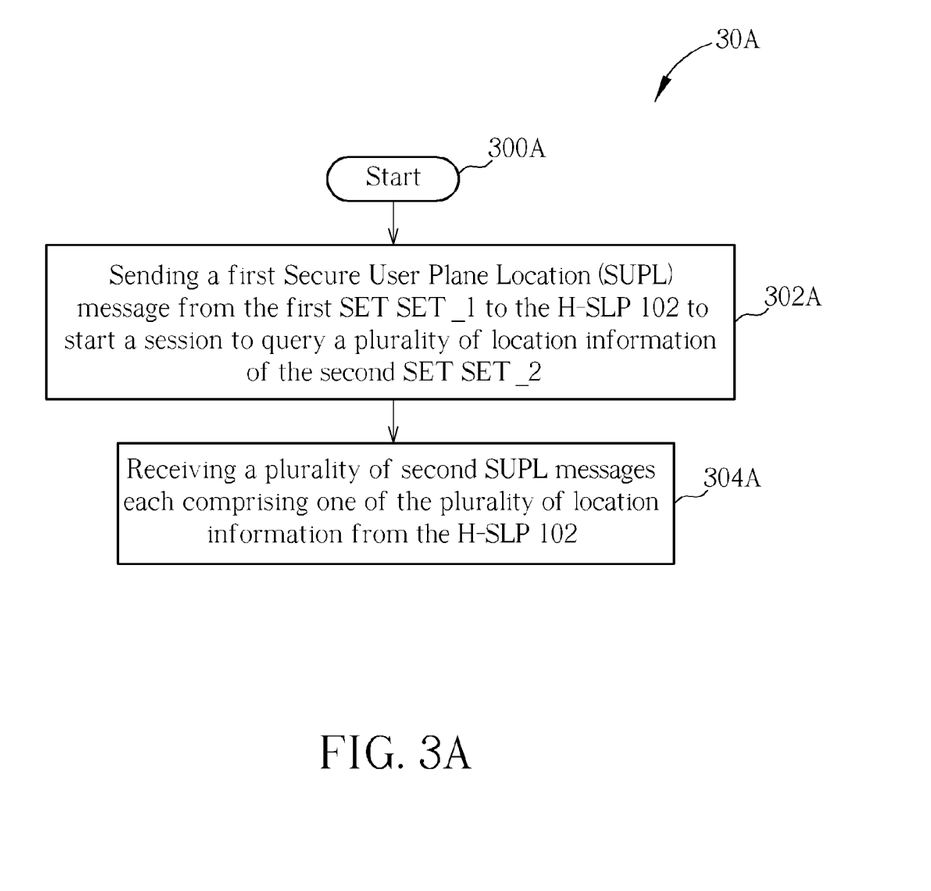
FIGS. 3A-3C are flowchart diagrams of exemplary processes of the present invention.
Figure 3B:
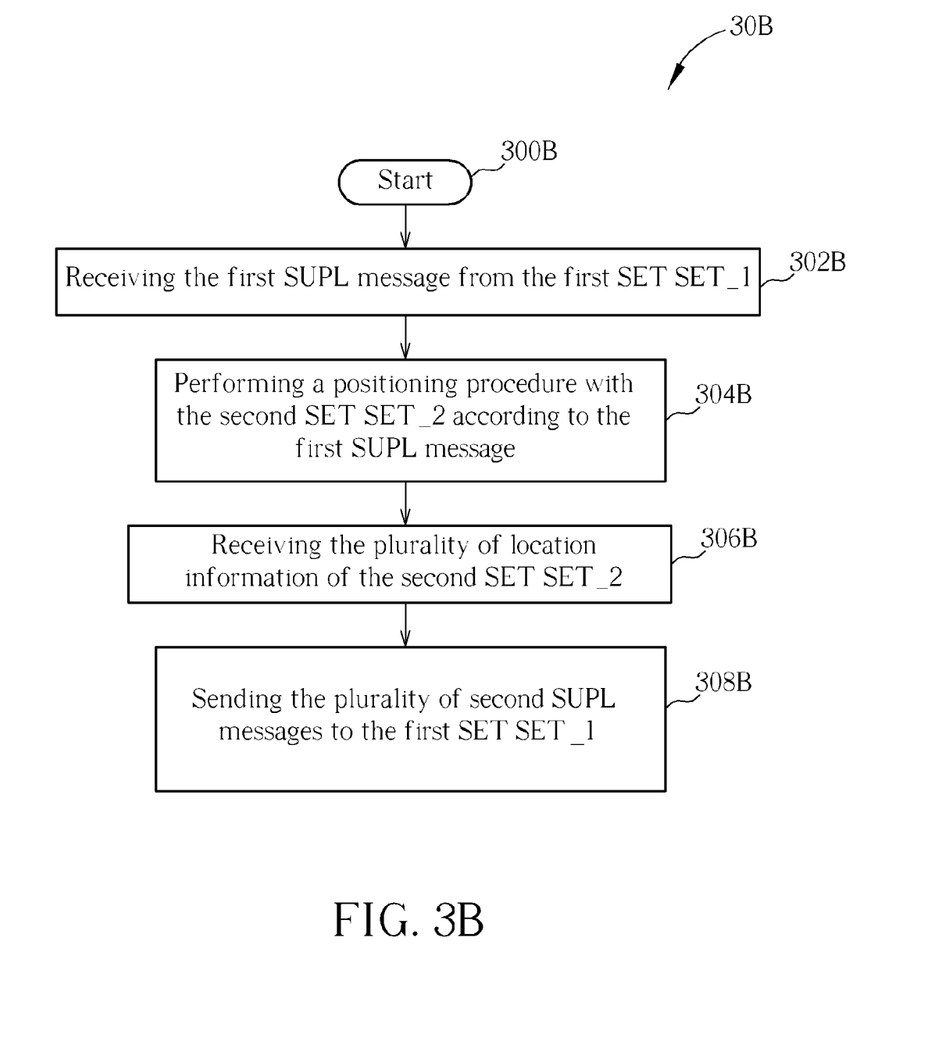
Figure 3C:
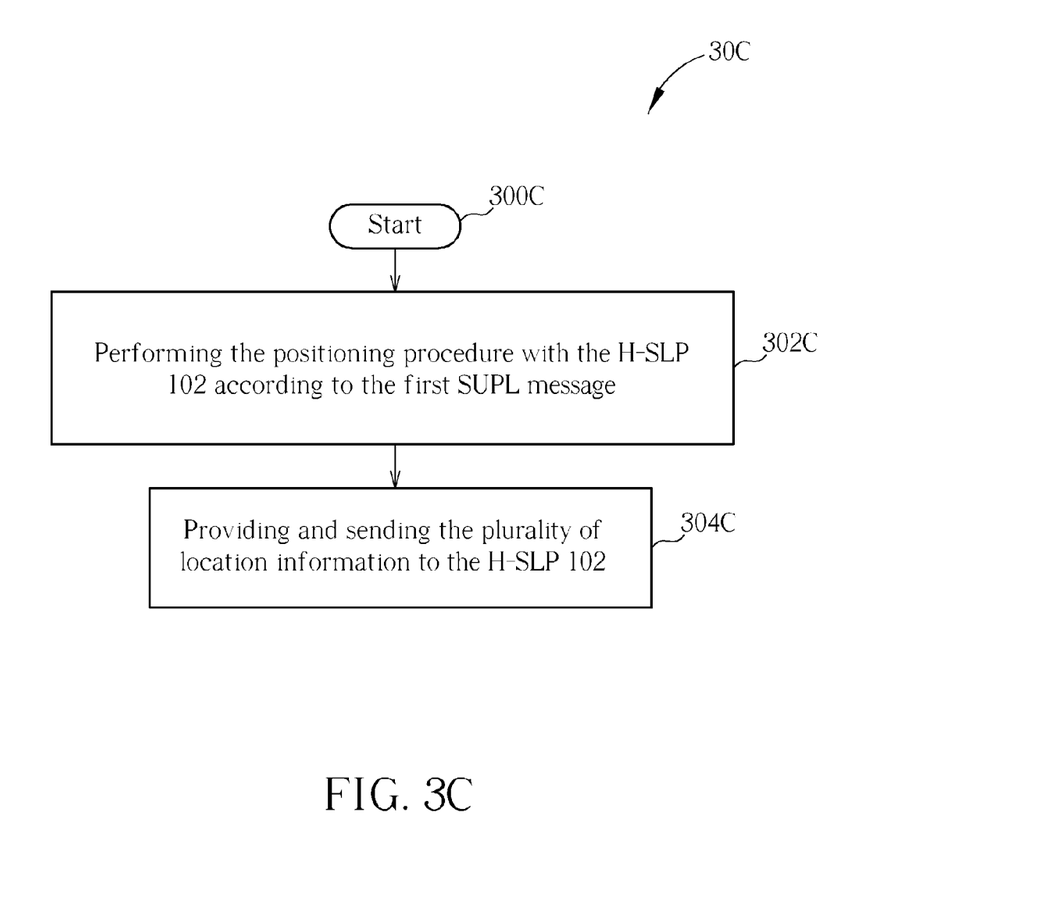

Please refer to FIGS. 3A-3C, which are flowchart diagrams of exemplary processes 30A-30C. The processes 30A-30C are used for a SET-to-SET location service, i.e. a SET (e.g. the first SET SET_1 in FIG. 1), for obtaining multiple location information of another SET (e.g. the second SET SET_2 in FIG. 1). The processes 30A-30C are executed in the first SET SET_1, the H-SLP 102 and the second SET SET_2 respectively. The process 30A can be compiled into the program code 214 and includes the following steps:

Step 300A: Start.

Step 302A: Sending a first Secure User Plane Location (SUPL) message from the first SET SET_1 to the H-SLP 102 to start a session to query a plurality of location information of the second SET SET_2.

Step 304A: Receiving a plurality of second SUPL messages each comprising one of the plurality of location information from the H-SLP 102.

The process 30B can be compiled into the program code 214 and includes the following steps:

Step 300B: Start.

Step 302B: Receiving the first SUPL message from the first SET SET_1.

Step 304B: Performing a positioning procedure with the second SET SET_2 according to the first SUPL message.

Step 306B: Receiving the plurality of location information of the second SET SET_2.

Step 308B: Sending the plurality of second SUPL messages to the first SET SET_1.

The process 30C can be compiled into the program code 214 and includes the following steps:

Step 300C: Start.

Step 302C: Performing the positioning procedure with the H-SLP 102 according to the first SUPL message.

Step 304C: Providing and sending the plurality of location information to the H-SLP 102.

According to the processes 30A-30C, the first SET SET_1 starts the session for querying the plurality of location information of the second SET SET_2 by sending a first SUPL message to the H-SLP 102. Notably, if the data connection between the first SET SET_1 and the network 100 is not yet established, the first SET SET_1 requests the network 100 to establish data connection, in order to start the session. Preferably, the first SUPL message is a SUPL SET INIT message including parameters such as Result Type, Trigger Type and Trigger Params. The SUPL SET INIT message may further include an optional parameter, for example, Stop Time or Number of Fixes. Result Type identifies the requested position result type (e.g. Absolute Position, Position relative to Reference Point or Position relative to SET). The Trigger Type parameter indicates SET initiated trigger service type (e.g. Periodic, Area Event or Velocity Event). The Trigger Params parameter indicates triggered session parameters according to the Trigger Type parameter (e.g. Velocity Event Type, Velocity Estimate and optionally Repeated Reporting when Trigger Type is Velocity Event). The Stop Time parameter indicates when the SET shall stop a session if the session has not already been stopped for other reasons. The Number of Fixes parameter indicates the number of positioning fixes during a session. Note that the SUPL SET INIT message may also include another parameter for starting a session. For example, the SUPL SET INIT message includes Target SET ID to locate a third party target SET.

When receiving the SUPL SET INIT message from the first SET SET_1, the H-SLP 102 performs the positioning procedure with the second SET SET_2 according to the SUPL SET INIT message. In detail, the H-SLP 102 transmits a SUPL INIT message to the second SET SET_2 to start a multiple-fix positioning. During the positioning procedure, the second SET SET_2 transmits location information to the H-SLP 102 for one or more times. The transmission of location information can be repeated before an end-condition happens. For example, the number of location information transmitted by the second SET SET_2 is based on the Number of Fixes parameter. For another example, the second SET SET_2 repeats transmitting location information until a time which is determined according to the Stop Time parameter. Once the location information from the second SET SET_2 is received, the H-SLP 102 forwards the location information to the first SET SET_1. The location information is included in the second SUPL message, which is exemplarily a SUPL REPORT message.

Figure 4:
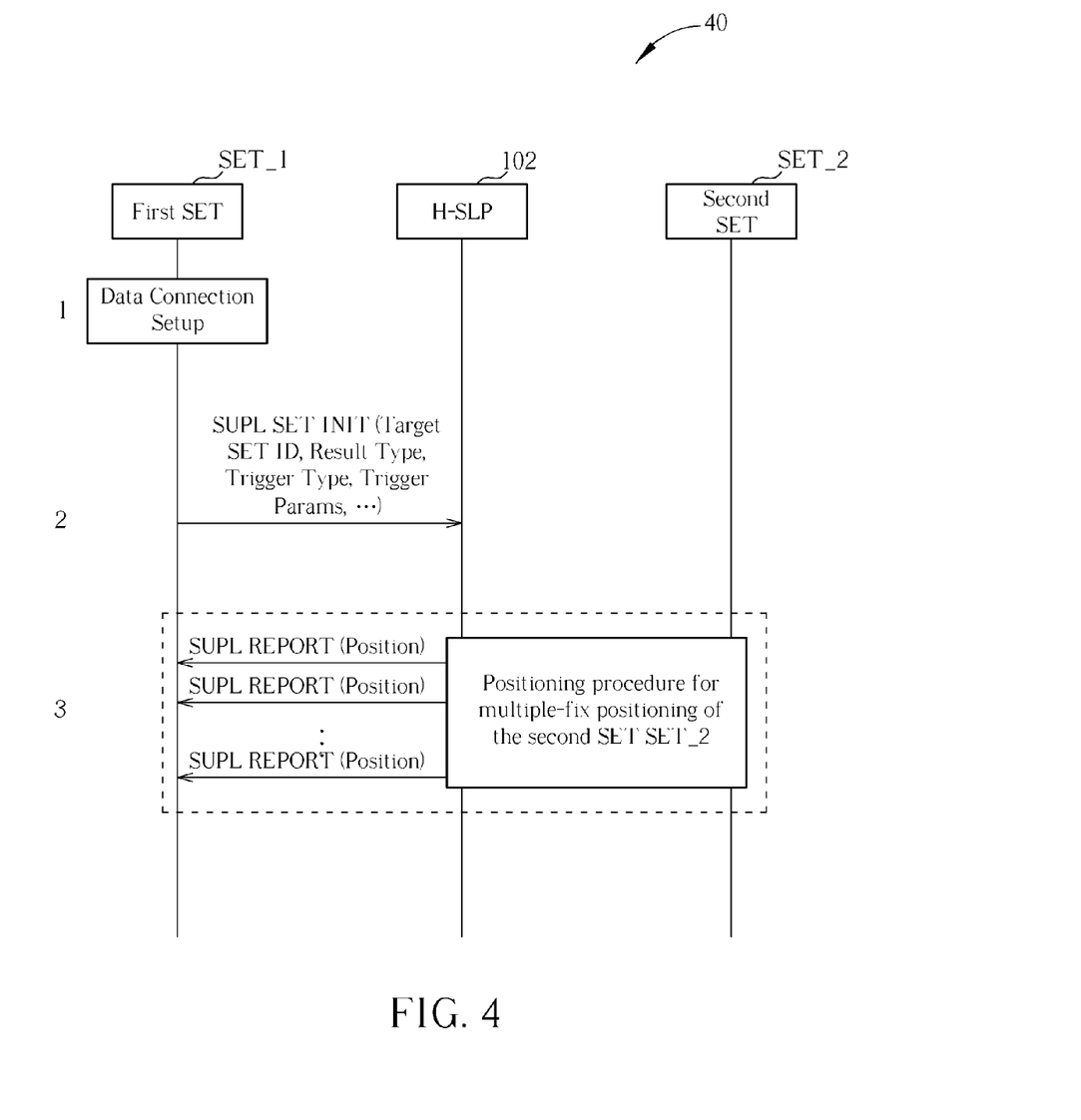
FIG. 4 is a message flow chart for the exemplary processes in FIGS. 3A-3C.

Please refer to FIG. 4, which is an exemplary sequence chart 40 according to the processes 30A-30C. In Stage 1, the first SET SET_1 checks whether the data connection between the first SET SET_1 and the network 100 is established. If the data connection between the first SET SET_1 and the network 100 is not established, the first SET SET_1 starts establishing a new data connection with the network 100. In Stage 2, the first SET SET_1 transmits a SUPL SET INIT message to request the H-SLP 102 to perform the positioning procedure with the second SET SET_2. The SUPL SET INIT message includes parameters Result Type, Trigger Type and Trigger Params. Mandatory parameter such as Target SET ID is also included in the SUPL SET INIT message. Optionally the SUPL SET INIT message can include the parameter Stop Time or Number of Fixes. In Stage 3, the H-SLP 102 performs the positioning procedure with the second SET SET_2, where the second SET SET_2 starts multiple-fix positioning according to the SUPL SET INIT message. For example, if the parameter Number of Fixes exists and is set to 5, the second SET SET_2 transmits the location information to the H-SLP 102 for five times before terminating the multiple-fix positioning. When receiving the location information from the second SET SET_2, the H-SLP 102 transmits the SUPL REPORT message, which includes the location information (i.e. in a Position parameter) of the second SET SET_2, to the first SET SET_1.

Figure 5:
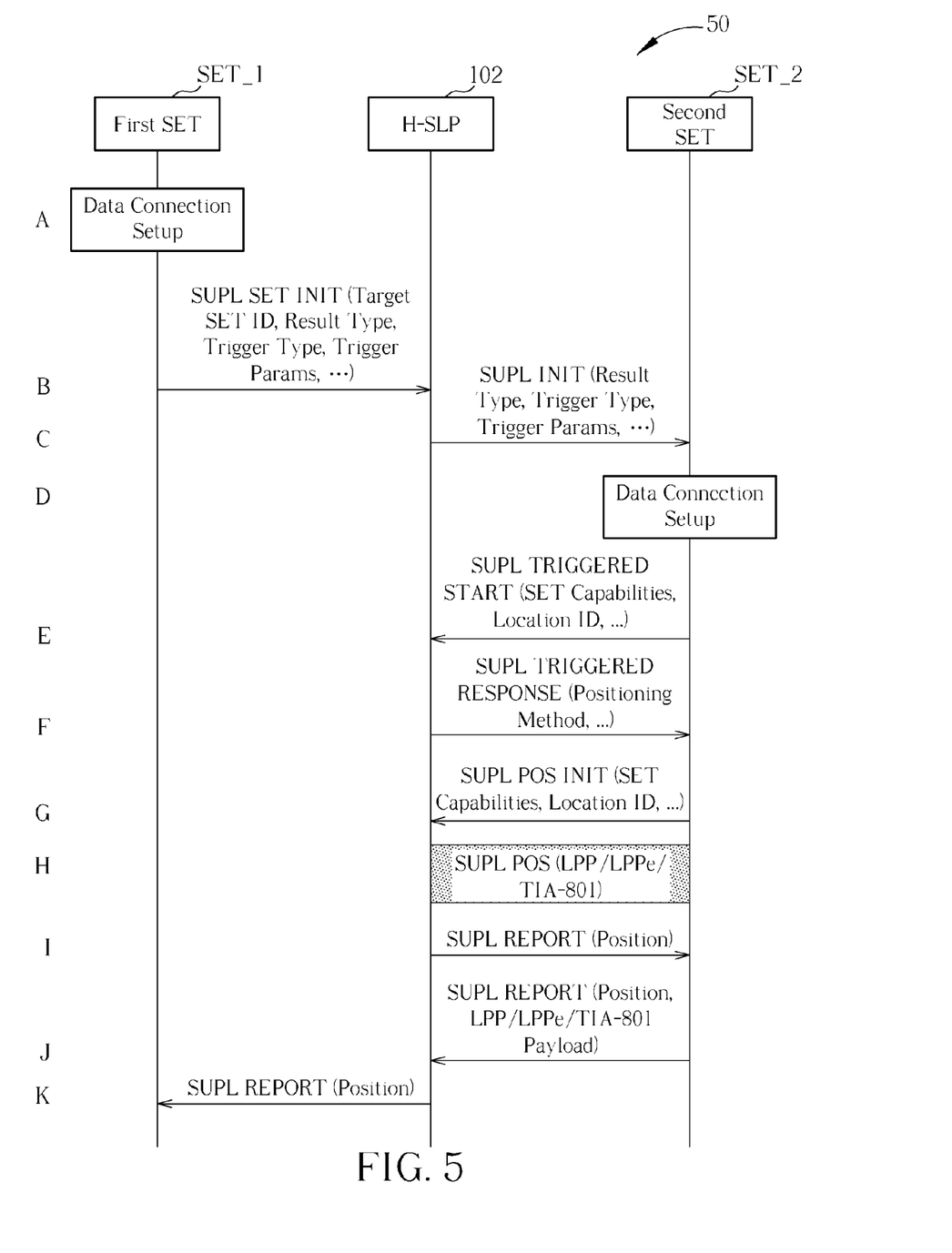
FIG. 5 is a message flow chart for the positioning procedure in FIG. 4.

FIG. 5 is another exemplary sequence chart 50 of the positioning procedure, where the positioning procedure is depicted in detail. Since Stage A and Stage B are respectively the same as Stage 1 and Stage 2 shown in FIG. 4, the description of Stage A and Stage B are not given herein. In Stage C, the H-SLP 102 transmits a SUPL INIT message to the second SET SET_2 to request the second SET SET_2 for starting a multiple-fix positioning. The SUPL INIT message includes parameters Result Type, Trigger Type, Trigger Params according to the SUPL SET INIT message, and Positioning Method. Other parameters (e.g. SLP capabilities and Quality of Position) may be optionally or conditionally included in the SUPL INIT message. The Positioning Method parameter is used to describe the intended positioning method, including SET based and SET assisted methods. The SLP Capabilities parameter is used to describe SLP's capabilities to a SET. The SLP's capabilities are used to indicate supported positioning protocols, e.g., LTE Positioning Protocol (LPP), LPP Extensions (LPPe) or TIA-801. The Quality of Position parameter includes a set of attributes associated with a request for the geographic position of SET. The attributes include the required horizontal accuracy, vertical accuracy, max location age, and response time of the SET position. The SUPL INIT message may be transmitted by OMA Push, Mobile-Terminated (MT) short message service (SMS), Session Initiation Protocol (SIP) Push, TCP/IP or UDP/IP method. Note that, if the data connection between the second SET SET_2 and the network 100 is not established, the H-SLP 102 cannot use the TCP/IP or UDP/IP method to transmit the SUPL INIT message. In Stage D, the second SET SET_2 checks whether the data connection between the second SET SET_2 and the network 100 is established. If the data connection between the second SET SET_2 and the network 100 is not established, the second SET SET_2 starts establishing a new data connection with the network 100. In Stage E, the second SET SET_2 transmits a SUPL TRIGGERED START message to start a triggered session between the second SET SET_2 and the H-SLP 102. The SUPL TRIGGERED START session includes parameters SET Capabilities and Location ID. The SET Capabilities parameter is used to describe SET's capabilities to the H-SLP 102. The SET's capabilities are used to indicate supported positioning protocols, e.g. LTE Positioning Protocol (LPP), LPP Extensions (LPPe) or TIA-801. The Location ID parameter is used to define current serving cell, current serving WLAN AP or current serving WiMAX BS information of a SET. Other parameters, such as Quality of Position and Trigger Type, are optionally or conditionally included in the SUPL TRIGGERED START message. In Stage F, the H-SLP 102 transmits a SUPL TRIGGERED RESPONSE message to the second SET SET_2, for confirming the triggered session. The SUPL TRIGGERED RESPONSE message is used to response the SUPL TRIGGERED START message in Stage E. The SUPL TRIGGERED RESPONSE message includes a Positioning Method parameter. Other parameters, such as Trigger Params and SLP Capabilities, are optionally or conditionally included in the SUPL TRIGGERED START message.

If the Positioning Method parameter is set as SET-assisted Assisted GPS (A-GPS), Stages G-I will be entered while Stage J will not. In Stage G, the second SET SET_2 transmits a SUPL POS INIT message to the H-SLP 102, for initialing a positioning protocol session. The SUPL POS INIT message includes the SET Capabilities parameter and a Location ID parameter. The Location ID parameter indicates current serving information (e.g. current serving cell) of a SET. In Stage H, the H-SLP 102 and the second SET SET_2 exchange one or more SUPL POS messages for location calculation. For example, in Stage H, the second SET SET_2 may provide required data for location information calculation at the H-SLP 102. In Stage I, when the location information of the second SET SET_2 is calculated by the H-SLP 102, the H-SLP 102 transmits an indication message to the second SET SET_2 to inform the second SET SET_2 that the location information of the second SET SET_2 is calculated by the H-SLP 102. Preferably, the indication message is another SUPL REPORT message different from the second SUPL message.

Moreover, if the Positioning Method parameter is set as SET-based autonomous or standalone, which means the second SET SET_2 calculates a position estimate without assistance data from the H-SLP 102, i.e., data required for calculating position estimate are obtained by the SET_2 itself, Stage J will be entered while Stages G-I will not. In Stage J, when the location information of the second SET SET_2 is calculated by the second SET SET_2 itself, the second SET SET_2 transmits the indication message to the H-SLP 102 to report the location information.

Alternatively, if the Positioning Method parameter is set as SET-based A-GPS, which means the second SET SET_2 calculates a position estimate with assistance data from the H-SLP 102, Stages G-H, J will be entered while Stage I will not. In Stage G, the second SET SET_2 transmits a SUPL POS INIT message to the H-SLP 102, for initialing a positioning protocol session. The SUPL POS INIT message includes the SET Capabilities parameter and a Location ID parameter. The Location ID parameter indicates current serving information (e.g. current serving cell) of a SET. In Stage H, the H-SLP 102 and the second SET SET_2 exchange one or more SUPL POS messages for location calculation. For example, in Stage H, the H-SLP 102 may provide required data for location information calculation at the second SET SET_2. In Stage J, when the location information of the second SET SET_2 is calculated by the second SET SET_2 itself, the second SET SET_2 transmits the indication message to the H-SLP 102 to report the location information. Optionally the indication message may include a LPP/LPPe/TIA-801 payload for sending enhanced cell/sector/AP measurement information.

In Stage K, when receiving the SUPL REPORT message from the second SET SET_2 (for SET-based A-GPS/SET-based autonomous/standalone method), or when the determination of the location information of the second SET SET_2 is done (for SET-assisted A-GPS method), the H-SLP 102 transmits the second SUPL message (e.g. SUPL REPORT) including the location information of the second SET SET_2 to the first SET SET_1.

If the session is going to be terminated according to the parameter Stop Time or Number of Fixes set in the SUPL SET INIT message or under other conditions (e.g. manually terminated), any among the first SET SET_1, the second SET SET_2 and the H-SLP 102 may send a third SUPL message to terminate the session. If the session is terminated by the first SET SET_1, the first SET SET_1 transmits the third message to the H-SLP 102 to stop the positioning procedure between the H-SLP 102 and the second SET SET_2. Preferably, the third SUPL message sent from the first SET SET_1 is a SUPL SET END message. The SUPL SET END message includes a Status Code parameter for error/information indication. The structure of the SUPL SET END message is the same as that of the SUPL END message. The difference between the SUPL SET END message and the SUPL END message is that, the SUPL END message is sent by entities involved in the positioning procedure (i.e. the H-SLP 102 and the second SET SET_2), while the SUPL SET END message is not. When receiving the SUPL SET END message, the H-SLP 102 stops the positioning procedure with the second SET SET_2 by transmitting a SUPL END message to the second SET SET_2. When receiving the SUPL END message, the second SET SET_2 stops multiple-fix positioning. Alternatively, the session may be terminated by the second SET SET_2. That is, the second SET SET_2 stops multiple-fix positioning and sends the third message to the H-SLP 102 to stop the positioning procedure with the H-SLP 102. Preferably, the third SUPL message sent from the second SET SET_2 is a SUPL END message. When receiving the SUPL END message from the second SET SET_2, the H-SLP 102 transmits another SUPL END message to the first SET SET_1, to indicate that the session is terminated. Alternatively, the session may be terminated by the H-SLP 102, i.e., the H-SLP 102 stops multiple-fix positioning and sends the third message to the second SET SET_2 to stop the positioning procedure with the second SET SET_2. Preferably, the third SUPL message sent from the second SET SET_2 is a SUPL END message. When receiving the SUPL END message from the H-SLP 102, the second SET SET_2 stops multiple-fix positioning. Also, the H-SLP 102 transmits another SUPL END message to the first SET SET_1, to indicate that the session is terminated. After the session being terminated, the first SET SET_1 and the second SET SET_2 release connections to the H-SLP 102.

Note that, the aforementioned communication system is an exemplary embodiment of the present invention. Those skilled in the art shall understand that the SETs (e.g. SET_1 and SET_2) may connect to different networks (e.g. UTRAN and E-UTRAN) and/or H-SLPs. Therefore, any modification or alteration according to embodiments of the present invention shall be within the spirit of the present invention.

To sum up, according to the methods disclosed in the present invention, a mobile device can initiate only one session to obtain multiple location information with different times of another mobile device via the SUPL network without establishing multiple sessions. Therefore, the methods disclosed in the present invention can improve network efficiency for a mobile device to obtain multiple position information of another mobile device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a SET to SET location service in a communication system, comprising:
    sending a first Secure User Plane Location (SUPL) message from a first SUPL enabled terminal (SET) of the communication system to a home SUPL Location Platform (H-SLP) of the communication system, for starting a session to query a plurality of location information of a second SET of the communication system;
    performing, by the H-SLP, a positioning procedure with the second SET according to the first SUPL message;
    providing, by the second SET, the plurality of location information;
    sending the plurality of the location information from the second SET to the H-SLP; and
    sending a plurality of second SUPL messages from the H-SLP to the first SET;
    wherein each of the plurality of second SUPL messages comprises one of the plurality of location information.

2. The method of claim 1, wherein the first SUPL message is a SUPL SET INIT message.

3. The method of claim 1, wherein the positioning procedure comprises:
    sending a SUPL INIT message from the H-SLP to the second SET, to start a multiple-fix positioning; and
    performing, by the second SET, the multiple-fix positioning to obtain the plurality of location information.

4. The method of claim 1, wherein the plurality of second SUPL messages is a plurality of second SUPL REPORT messages.

5. The method of claim 1, further comprising:
    sending a third SUPL message to terminate the session.

6. The method of claim 5, wherein the third SUPL message is a SUPL SET END message sent from the first SET;
    wherein the SUPL SET END message comprises a Status Code, for indicating the H-SLP to stop the positioning procedure.

7. The method of claim 5, wherein the third SUPL message is a SUPL END message sent from the second SET, for stopping the positioning procedure.

8. The method of claim 5, wherein the third SUPL message is a SUPL END message sent from the H-SLP, for stopping the positioning procedure.

9. The method of claim 1, wherein the first SUPL message comprises an end-condition parameter, for controlling the positioning procedure.

10. The method of claim 9, wherein the end-condition parameter comprises a number-of-fix value, for determining a number of positioning fixes of the second SET.

11. The method of claim 9, wherein the end-condition parameter comprises a stop-time value, for determining when to stop the positioning procedure.

12. A method of performing a SET-to-SET location service in a communication system for a first SUPL Enabled Terminal (SET), comprising:
   sending a first Secure User Plane Location (SUPL) message to a home SUPL Location Platform (H-SLP) of the communication system, for starting a session to query a plurality of location information of a second SET of the communication system; and
   receiving a plurality of second SUPL messages from the H-SLP;
   wherein the H-SLP starts a positioning procedure with the second SET when the H-SLP receives the first SUPL message, and wherein each of the plurality of second SUPL messages comprises one of the plurality of location information.

13. A method of performing a SET-to-SET location service in a communication system for a home SUPL Location Platform (H-SLP), comprising:
   receiving a first Secure User Plane Location (SUPL) message from a first SUPL Enabled Terminal (SET) of the communication system for starting a session to query a plurality of location information of a second SET of the communication system;
   performing a positioning procedure with the second SET according to the first SUPL message;
   receiving the plurality of location information of the second SET; and
   sending a plurality of second SUPL messages to the first SET;
   wherein each of the plurality of second SUPL messages comprises one of the plurality of location information.

14. A method of performing a SET-to-SET location service in a communication system for a second SUPL Enabled Terminal (SET), comprising:
   performing a positioning procedure with a home SUPL Location Platform (H-SLP) of the communication system;
   providing a plurality of location information; and
   sending the plurality of the location information to the H-SLP;
   wherein the positioning procedure is started by the H-SLP when the H-SLP receives a Secure User Plane Location (SUPL) message from a first SET.

\* \* \* \* \*